(12) United States Patent
Lehmann et al.

(10) Patent No.: US 9,764,603 B2
(45) Date of Patent: Sep. 19, 2017

(54) METHOD FOR DETERMINING THE DEPTH OF TREAD OF A VEHICLE TIRE WITH A TIRE MODULE ARRANGED ON THE INNER SIDE OF THE TIRE

(71) Applicant: Continental Reifen Deutschland GmbH, Hannover (DE)

(72) Inventors: Joerg Lehmann, Hannover (DE); Bernd Lange, Bueckeburg (DE)

(73) Assignee: Continental Reifen Deutschland GmbH, Hannover (DE)

( * ) Notice: Subject to any disclaimer, the term of this patent is extended or adjusted under 35 U.S.C. 154(b) by 288 days.

(21) Appl. No.: 14/642,114

(22) Filed: Mar. 9, 2015

(65) Prior Publication Data

US 2015/0174967 A1 Jun. 25, 2015

Related U.S. Application Data

(63) Continuation of application No. PCT/EP2013/066596, filed on Aug. 8, 2013.

(30) Foreign Application Priority Data

Sep. 7, 2012 (DE) .................. 10 2012 108 348

(51) Int. Cl.
*B60C 11/24* (2006.01)
*G01M 17/02* (2006.01)

(52) U.S. Cl.
CPC .......... *B60C 11/243* (2013.01); *B60C 11/246* (2013.01); *G01M 17/02* (2013.01)

(58) Field of Classification Search
CPC ..... B60C 11/243; B60C 11/246; G01M 17/02
See application file for complete search history.

(56) References Cited

U.S. PATENT DOCUMENTS

| 5,749,984 A | 5/1998 | Frey et al. |
| 7,577,532 B2 | 8/2009 | Ichikawa et al. |
| 2010/0186492 A1* | 7/2010 | Morinaga ............... B60C 11/24 73/146 |

FOREIGN PATENT DOCUMENTS

| JP | 2005-205956 A | 8/2005 |
| JP | 2007-153034 A | 6/2007 |

OTHER PUBLICATIONS

International Search Report dated Sep. 20, 2013 of international application PCT/EP2013/066596 on which this application is based.

* cited by examiner

*Primary Examiner* — Paul West
(74) *Attorney, Agent, or Firm* — Walter Ottesen, P.A.

(57) ABSTRACT

A method for measuring the depth of tread in a vehicle tire includes measuring acceleration signals from a tire module arranged on the inner side of the tire. A minimum acceleration value is then determined during rotation of the vehicle tire and at a constant traveling speed whereafter the maximum internal radius of the inner side of the tire is determined in the center of a ground contact area of the vehicle tire. The depth of tread of the vehicle tire is determined with signal processing whereafter the determined depth of tread is transmitted to a receiving unit in the vehicle.

13 Claims, 1 Drawing Sheet

METHOD FOR DETERMINING THE DEPTH OF TREAD OF A VEHICLE TIRE WITH A TIRE MODULE ARRANGED ON THE INNER SIDE OF THE TIRE

CROSS REFERENCE TO RELATED APPLICATIONS

This application is a continuation application of international patent application PCT/EP2013/066596, filed Aug. 8, 2013, designating the United States and claiming priority from German application 10 2012 108 348.7, filed Sep. 7, 2012, and the entire content of both applications is incorporated herein by reference.

FIELD OF THE INVENTION

The invention relates to a method for determining the depth of tread of a vehicle tire.

BACKGROUND OF THE INVENTION

It is known to use tire pressure monitoring on vehicle tires for reliably detecting a loss of pressure.

While various systems that carry out tire pressure monitoring during travel are provided for the tire pressure, the depth of tread of the vehicle tires still always has to be measured manually.

SUMMARY OF THE INVENTION

It is an object of the invention to provide a method by which conventional systems for measuring the depth of tread in a vehicle tire can be improved.

The object is achieved by a method including the following steps:
a) measuring acceleration signals from a tire module arranged on the inner side of the tire with the tire module being arranged substantially opposite the tread strip and including an acceleration sensor for measuring acceleration values in the radial direction;
b) determining a minimum acceleration value during rotation of the vehicle tire and at a constant traveling speed,
the tread strip, with the tire module lying opposite, being located in the region of the ground contact area of the vehicle tire at the time of the acceleration measurement;
c) determining the maximum internal radius of the inner side of the tire in the center of the ground contact area of the vehicle tire,
the maximum internal radius reflecting the curvature of the inner side of the tire in the circumferential direction of the ground contact area and
being substantially dependent on the thickness of the rubber package between the tire belt and the roadway, the maximum internal radius being determined from the quotient of the traveling speed squared and the minimum acceleration value;
d) determining the depth of tread of the vehicle tire with signal processing,
the maximum internal radius changing significantly as the depth of tread decreases and the determination of the depth of tread being based on the fact that the depth of tread is coupled with the maximum internal radius via a direct mathematical function; and,
e) transmitting the determined depth of tread to a receiving unit in the vehicle and/or indicating the depth of tread by an indicating device.

An advantage of the invention is that the depth of tread can be easily determined by the method according to the invention in the case of vehicle tires with a tire module arranged on the inner side of the tire.

Corresponding tire modules generally have an acceleration sensor that is used for various functions. Surprisingly, the measuring signals of the acceleration sensor can likewise be used for measuring and monitoring the depth of tread. There is no need for a further special sensor, which would have to be additionally integrated in the tire module. The depth of tread can be determined indirectly by a signal evaluation of the acceleration values. This makes it possible to dispense with the tiresome checking of the depth of tread with a mechanical depth of tread gage.

In particular, in the case of a truck with a trailer, a great amount of work is saved by having automatic depth of tread monitoring.

According to a feature of the invention, in step b), a reference acceleration value is measured on a new vehicle tire without tread wear, this reference acceleration value being used as a comparison value for determining the depth of tread in the signal processing.

The reference acceleration value can be easily stored directly in the memory system of the tire module or of the receiver and is used as a comparison value for the subsequent measuring signals.

According to another feature of the invention, in step c), the traveling speed is determined from the constant internal radius of the inner side of the tire and the constant acceleration value outside the ground contact area. This allows the traveling speed to be determined quickly and easily.

According to another feature of the invention, in step c), the traveling speed from the vehicle tachometer is used for the signal processing. The traveling speed from the vehicle tachometer of the vehicle can be easily integrated in the signal processing.

According to still another feature of the invention, a maximum acceleration value when the tire module enters the ground contact area is used as a triggering signal for subsequently recording the minimum acceleration value by continuous measurements in step b). One difficulty is that of determining the minimum acceleration value. With the triggering signal, the high accelerations on entering the contact area can be used for identifying the region relevant for measuring.

According to another feature of the invention, the measuring of the acceleration values takes place while the vehicle is to the greatest extent being driven constantly. As a result, the measuring accuracy for measuring the minimum acceleration value will increase.

According to another feature of the invention, the measuring of the acceleration values takes place at vehicle speeds greater than about 70 km/h.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
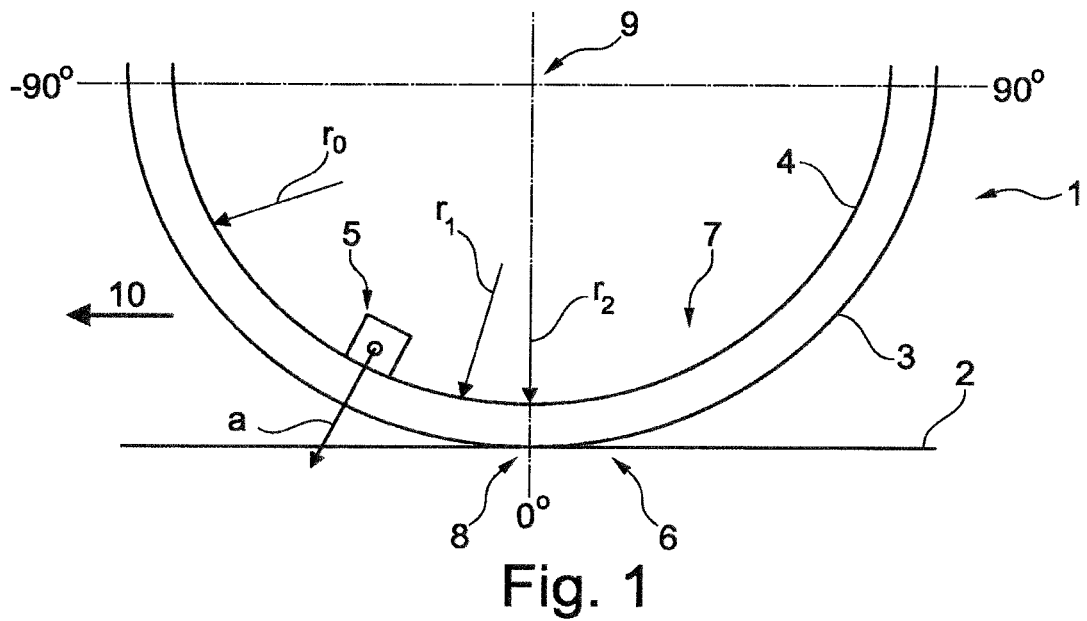
FIG. 1 is a schematic showing a cross section through a vehicle tire rolling on a roadway.

FIG. 1 schematically shows a cross section through a vehicle tire 1, which is rolling on a roadway 2. The vehicle tire 1 is shown in cross-section with the vehicle tire rotating about the central axis 9. The vehicle tire 1 is rolling on the roadway 2 in the traveling direction 10. A tire module 5 with an integrated acceleration sensor is arranged on the inner side 4 of the tire which is formed by a tire inner liner. The acceleration sensor measures acceleration values (a) in the radial direction at different points in time. The flattened ground contact area 6 of the vehicle tire lies against the roadway surface 2. Shown opposite the ground contact area 6 is the likewise flattened inner side 7 of the tire, which is arranged opposite the ground contact area. FIG. 1 shows that the internal radius (r) changes continuously during the rolling on the roadway. The internal radius $r_0$ is the internal radius outside the ground contact area. This internal radius is generally constant and is only dependent on the particular type of tire. The internal radius $r_2$ is the maximum internal radius in the center of the ground contact area 8. Because of the flattened inner side of the tire, the internal radius $r_2$ is generally greater than the internal radius $r_0$. The internal radius $r_1$ substantially reproduces the internal radius that applies on entering the ground contact area 6.

The outer side of the tread strip 3 is likewise schematically shown. The angular indications −90°, 0° and +90° relate to the circumference of the vehicle tire. What is decisive is that the curvature of the inner side of the tire in the circumferential direction in the ground contact area is substantially dependent on the thickness of the rubber package between the tire belt and the roadway. The curvature or the internal radius of the inner side of the tire is consequently a function of the depth of tread. In the case of a completely worn vehicle tire without a tire tread, the curvature of the inner side of the tire in the ground contact area is virtually 0, that is, the inner side of the tire runs virtually parallel to the roadway surface. On a new tire, in particular on tires of commercial vehicles, there is a relatively thick rubber package between the tire belt and the road. This rubber package provides for a relatively great curvature of the inner side of the tire, as shown in FIG. 1.

Figure 2:
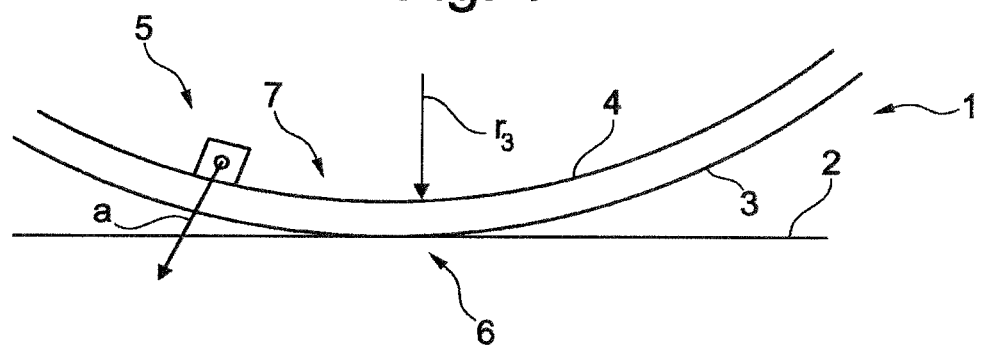
FIG. 2 is a schematic showing the vehicle tire whereon the tread thereof has been worn by abrasion; and, FIG. 3 is a graph showing acceleration (a) plotted as a function of the circumference of the tire.

FIG. 2 schematically shows the vehicle tire 1 on which the tread of the tire has been worn by abrasion. The rubber package between the tire belt and the roadway surface is now only relatively thin. This has the consequence that the internal radius $r_3$ is less than the internal radius $r_2$ that applies on a new tire. The increasing internal radius $r_3$ is consequently an indicator of a decreasing depth of tread of the vehicle tire. The radius on the inner side of the tire can be calculated from the quotient of the traveling speed squared and the corresponding acceleration (a).

Figure 3:
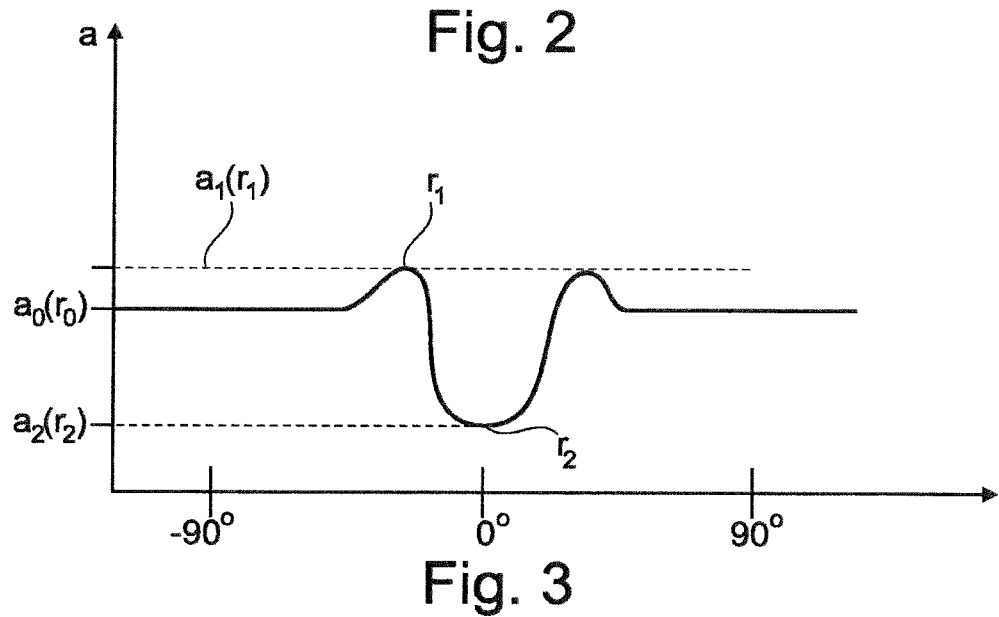

FIG. 3 shows the acceleration signal (a) when the vehicle tire enters and leaves the ground contact area. The acceleration (a), measured by the acceleration sensor of the tire module, is plotted on the y axis. The acceleration value $a_0$ is constant outside the ground contact area. On entering the ground contact area, the acceleration value increases briefly to the maximum acceleration $a_1$. This acceleration value $a_1$ may be used as a triggering signal for identifying the subsequent relevant measuring region. Subsequently, the acceleration value (a) falls to the minimum value $a_2$. This acceleration value $a_2$ corresponds to the acceleration value when the tire module is located substantially in the center of the ground contact area. This acceleration value $a_2$ can be used to determine the internal radius $r_2$, which is a measure of the depth of tread of the vehicle tire. The constant acceleration value $a_0$ may be used for determining the traveling speed. As an alternative to this, the traveling speed may be taken from the vehicle tachometer of the vehicle.

Functions for determining the depth of tread:

$$V^2/a_1 = r_1 \qquad \text{Equation I}$$

$$\text{Depth of tread} = f(r_1) \qquad \text{Equation II}$$

$$V = \sqrt{(a_0 * r_0)} \qquad \text{Equation III}$$

The internal radius can be determined with Equation I.

Equation II signifies that the depth of tread is a function of the internal radius $r_1$.

With Equation III, the constant traveling speed V can be determined.

It is understood that the foregoing description is that of the preferred embodiments of the invention and that various changes and modifications may be made thereto without departing from the spirit and scope of the invention as defined in the appended claims.

LIST OF DESIGNATIONS (PART OF THE DESCRIPTION)

1 vehicle tire
2 roadway
3 outer side of the tread strip
4 inner side of the tire or tire inner liner
5 tire module with acceleration sensor
6 flattened ground contact area of the vehicle tire
7 flattened inner side of the tire opposite the ground contact area of the vehicle tire
8 center of the ground contact area in the circumferential direction of the vehicle tire
9 central axis
10 traveling direction
a acceleration in the radial direction
$a_0$ constant acceleration value outside the ground contact area (with constant internal radius $r_0$)
$a_1$ maximum acceleration value on entering the ground contact area
$a_2$ minimum acceleration value in the center of the ground contact area (with maximum internal radius $r_2$)
$r_0$ constant internal radius of the vehicle tire
$r_1$ internal radius on entering the ground contact area
$r_2$ maximum internal radius in the center of the ground contact area
V traveling speed

What is claimed is:

1. A method for determining the depth of tread in a tread strip of a vehicle tire having a tire module arranged on the inner side of the tire lying substantially opposite the tread strip, the tire module including an acceleration sensor for measuring acceleration values (a, $a_0$, $a_1$, $a_2$) in the radial direction, the method comprising the steps of:
   a) measuring acceleration signals emitted from said tire module;
   b) determining a minimum acceleration value ($a_2$) during rotation of the vehicle tire and at a constant traveling speed (V) when, at the time point of the measuring of the acceleration signals, the tread strip with the tire module is disposed in the region of the ground contact area of the vehicle tire;

c) determining the maximum internal radius of curvature of the inner side of the tire in the center of the ground contact area of the vehicle tire from the quotient of the traveling speed (V) squared and the minimum acceleration value ($a_2$) with the maximum internal radius of curvature defining the curvature of the inner side of the tire in the circumferential direction of the ground contact area and being substantially dependent on the thickness of the rubber package between the tire belt and the roadway;

d) determining the depth of tread of the vehicle tire with signal processing with the maximum internal radius of curvature changing significantly as the depth of tread decreases and the determination of the depth of tread being based on the fact that the depth of tread is coupled with the maximum internal radius of curvature via a direct mathematical function; and, e) then doing at least one of the following: transmitting the determined depth of tread to a receiving unit in the vehicle and indicating the depth of tread by an indicating device.

2. The method of claim 1, wherein in step b), a reference acceleration value is measured on a new vehicle tire without tread wear; and, this reference acceleration value is used as a comparison value for determining the depth of tread in the signal processing.

3. The method of claim 2, wherein in step c), the traveling speed (V) is determined from the constant internal radius of curvature ($r_0$) of the inner side of the tire and the constant acceleration value ($a_0$) outside the ground contact area.

4. The method of claim 1, wherein in step c), the traveling speed (V) from the vehicle tachometer is used for the signal processing.

5. The method of claim 4, wherein a maximum acceleration value ($a_1$) when the tire module enters the ground contact area is used as a triggering signal for subsequently recording the minimum acceleration value ($a_2$) by continuous measurements in step b).

6. The method of claim 5, wherein the measuring of the acceleration values ($a_1$, $a_2$) takes place while the vehicle is being driven constantly.

7. The method of claim 6, wherein the measuring of the acceleration values ($a_1$, $a_2$) takes place at vehicle speeds greater than about 70 km/h.

8. The method of claim 1, wherein in step c), the traveling speed (V) is determined from the constant internal radius of curvature ($r_0$) of the inner side of the tire and the constant acceleration value ($a_0$) outside the ground contact area.

9. The method of claim 1, wherein in step c), the traveling speed (V) from the vehicle tachometer is used for the signal processing.

10. The method of claim 1, wherein a maximum acceleration value ($a_1$) when the tire module enters the ground contact area is used as a triggering signal for subsequently recording the minimum acceleration value ($a_2$) by continuous measurements in step b).

11. The method of claim 1, wherein the measuring of the acceleration values ($a_1$, $a_2$) takes place while the vehicle is being driven constantly.

12. The method of claim 1, wherein the measuring of the acceleration values ($a_1$, $a_2$) takes place at vehicle speeds greater than about 70 km/h.

13. A method for determining the depth of tread in a tread strip of a vehicle tire having a tire module arranged on the inner side of the tire lying substantially opposite the tread strip, the tire module including an acceleration sensor for measuring acceleration values (a, $a_0$, $a_1$, $a_2$) in the radial direction, the method comprising the steps of:

a) measuring acceleration signals emitted from said tire module;

b) determining a minimum acceleration value ($a_2$) during rotation of the vehicle tire and at a constant traveling speed (V) when, at the time point of the measuring of the acceleration signals, the tread strip with the tire module is disposed in the region of the ground contact area of the vehicle tire;

c) determining the maximum internal radius of curvature of the inner side of the tire in the center of the ground contact area of the vehicle tire from the quotient of the traveling speed (V) squared and the minimum acceleration value ($a_2$) with the maximum internal radius of curvature defining the curvature of the inner side of the tire in the circumferential direction of the ground contact area and being substantially dependent on the thickness of the rubber package between the tire belt and the roadway;

d) determining the depth of tread of the vehicle tire with signal processing with the maximum internal radius of curvature changing significantly as the depth of tread decreases and the determination of the depth of tread being based on the fact that the depth of tread is coupled with the maximum internal radius of curvature via a direct mathematical function, wherein the depth of tread=f ($r_1$); and, e) then doing at least one of the following: transmitting the determined depth of tread to a receiving unit in the vehicle and indicating the depth of tread by an indicating device.

* * * * *